United States Patent
Lanser

[19]

[11] Patent Number: 5,951,155
[45] Date of Patent: Sep. 14, 1999

[54] VARIABLE INTENSITY LIGHT ASSEMBLY

[75] Inventor: Michael L. Lanser, Holland, Mich.

[73] Assignee: Prince Corporation, Holland, Mich.

[21] Appl. No.: 08/922,769

[22] Filed: Sep. 3, 1997

[51] Int. Cl.[6] .................................................. B60Q 1/00
[52] U.S. Cl. ..................... 362/490; 362/295; 362/394; 362/488; 362/512; 362/513
[58] Field of Search ................................... 362/488, 490, 362/508, 512, 513, 523, 295, 394, 427, 287; 200/2

[56] References Cited

U.S. PATENT DOCUMENTS

| | | |
|---|---|---|
| 1,997,258 | 4/1935 | Krieger . |
| 2,165,199 | 7/1939 | Batcheller . |
| 2,996,608 | 8/1961 | Clayton . |
| 2,999,150 | 9/1961 | Kallel . |
| 3,515,863 | 6/1970 | Jungwirth . |
| 4,686,609 | 8/1987 | Dykstra et al. . |
| 5,070,434 | 12/1991 | Suman et al. ............................... 362/74 |
| 5,325,275 | 6/1994 | Liu . |
| 5,377,087 | 12/1994 | Yoon . |
| 5,508,897 | 4/1996 | Van Order ................................ 362/280 |
| 5,596,247 | 1/1997 | Martich et al. ............................ 315/56 |
| 5,788,518 | 8/1998 | Wachter et al. ........................... 439/121 |

FOREIGN PATENT DOCUMENTS

| | | |
|---|---|---|
| 2209285 | 9/1973 | Germany . |
| 58-126231 | 7/1983 | Japan . |
| 918264 | 2/1963 | United Kingdom . |

*Primary Examiner*—Sandra O'Shea
*Assistant Examiner*—Michael J. Smith
*Attorney, Agent, or Firm*—Price, Heneveld, Cooper, DeWitt & Litton

[57] ABSTRACT

A light assembly comprises a fixed mounting plate on which there is positioned a variable resistor, a rotatable member including an arm engaging the variable resistor and a lamp subassembly pivotally mounted to the rotatable member and keyed to the rotatable member such when the lamp subassembly is rotated in a plane generally parallel to a lens associated with the lamp subassembly, the rotatable member moves with respect to the fixed mounting plate, thereby varying the resistance, which is coupled in series with a lamp contained within the lamp subassembly for varying the intensity of the illumination therefrom. In a preferred embodiment also, the lamp subassembly includes a lens having a knob associated therewith such that the lamp subassembly can be tilted and rotated for directing and varying the intensity of the illumination therefrom.

15 Claims, 2 Drawing Sheets

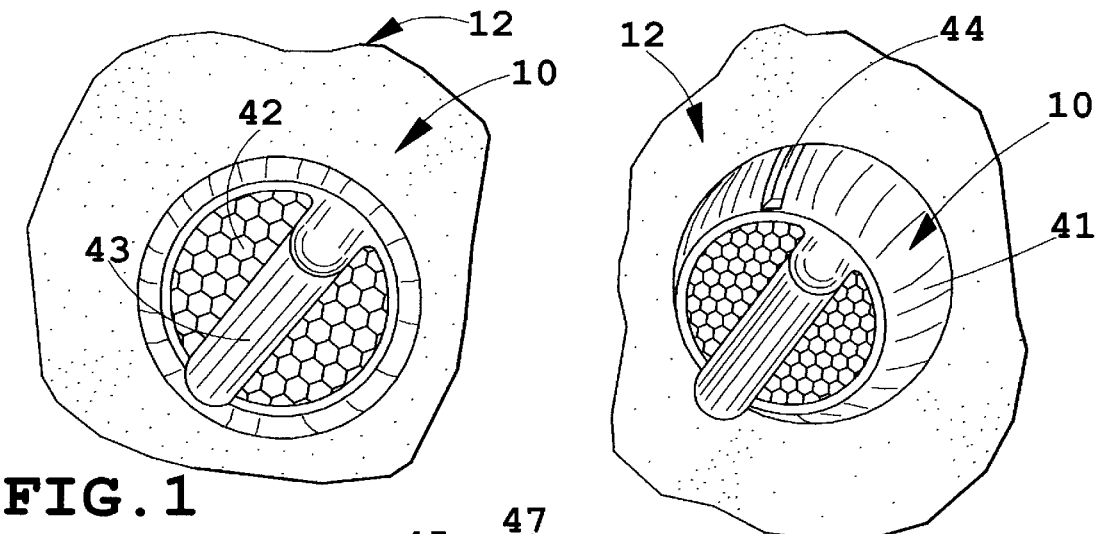
FIG. 1
FIG. 2
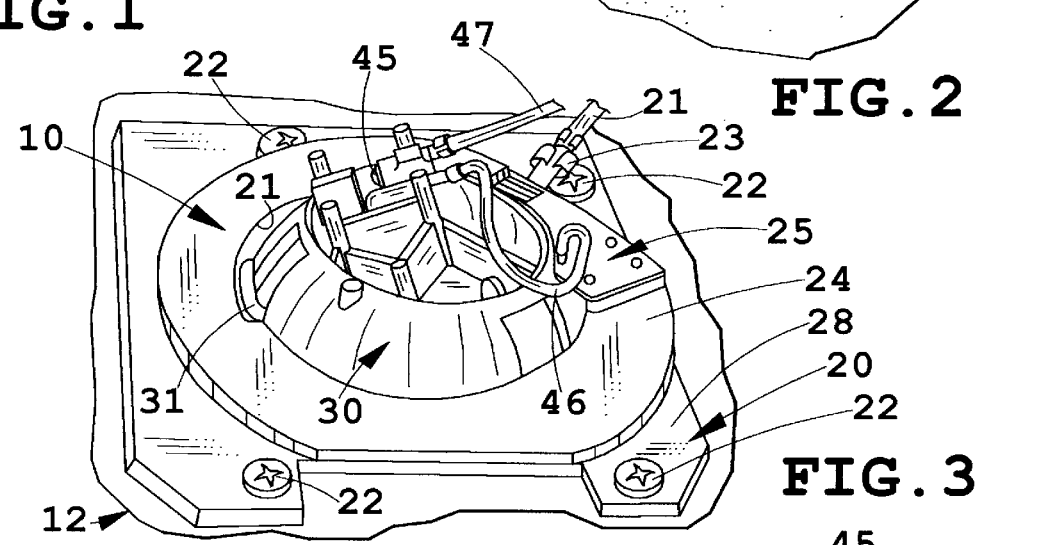
FIG. 3
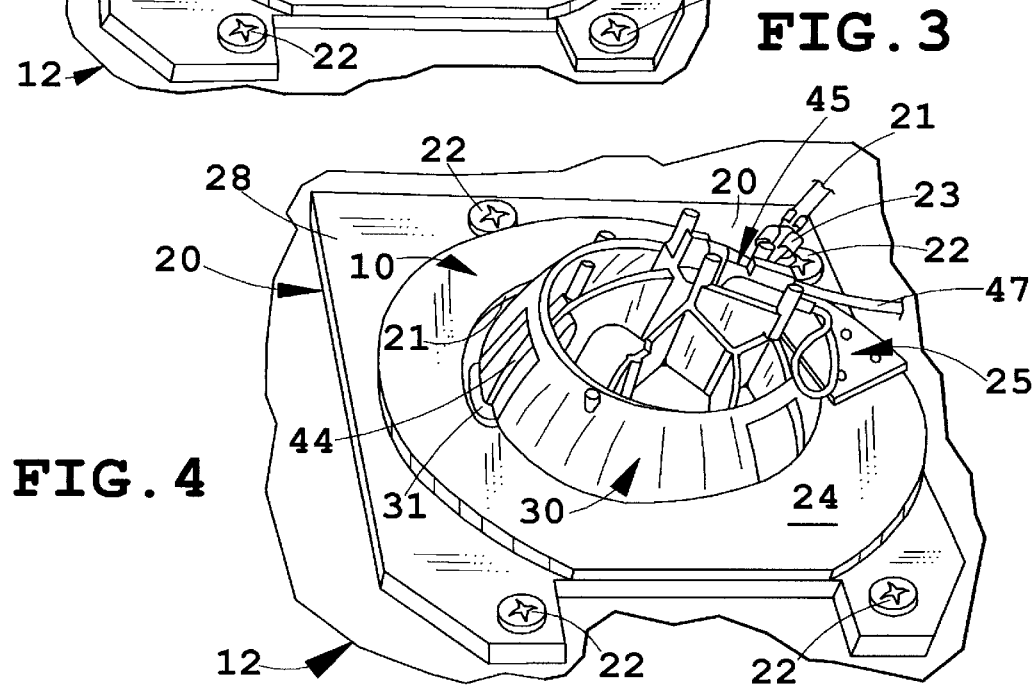
FIG. 4

VARIABLE INTENSITY LIGHT ASSEMBLY

BACKGROUND OF THE INVENTION

The present invention relates to an overhead light assembly for use in a vehicle and particularly to a directable and variable intensity light assembly.

Courtesy lights are commonly used in vehicles to provide interior lighting for ingress and egress or for interior illumination when, for example, reading a map or other material in low ambient light conditions. Overhead consoles frequently include lights for providing spot lighting which is directable utilizing a ball and socket or "bullet" type mounting structure. Some lights provide selectable lenses for providing both diffuse and spot lighting. U.S. Pat. Nos. 4,686,609; 5,070,434; and 5,508,897 are representative of such selectable lighting assemblies.

There remains a need, however, for a directable lighting system which can also vary the intensity of light according to the particular need at the time of use such that regardless of the type of light, i.e. direct or diffuse, the intensity of the light can be varied as well as the direction of the light.

SUMMARY OF THE PRESENT INVENTION

The lighting system of the present invention provides a directable and intensity controllable light preferably for use in association with an overhead lighting fixture for a vehicle and, in a preferred embodiment, utilizing a ball and socket pivotally adjustable fixture. In a preferred embodiment of the invention, a light assembly comprises a fixed housing on which there is positioned a variable resistance, a rotatable member including a member engaging said variable resistance and a lamp subassembly pivotally mounted to said rotatable member and keyed to said rotatable member. When said lamp subassembly is rotated, the resistance, which is coupled in series with a lamp contained within said lamp subassembly, varies for varying the intensity of the illumination from the lamp in the lamp subassembly. In a preferred embodiment also, the lamp subassembly includes a knob associated therewith such that the lamp subassembly can be tilted and rotated for directing and varying the intensity of the illumination.

These and other features, objects and advantages of the present invention will become apparent upon reading the following description thereof together with reference to the accompanying drawings.

BRIEF DESCRIPTION OF THE DRAWINGS

FIG. 1 is a fragmentary plan view of a light assembly embodying the present invention, shown mounted to the headliner of a vehicle;

FIG. 2 is a fragmentary perspective view of the light assembly shown in FIG. 1;

FIG. 3 is a rear perspective view of the light assembly shown in FIGS. 1 and 2, shown in a first adjusted position;

FIG. 4 is a rear perspective view of the light assembly shown in FIG. 3, shown tilted in a second adjusted position;

DETAILED DESCRIPTION OF THE PREFERRED EMBODIMENT

Figure 6:
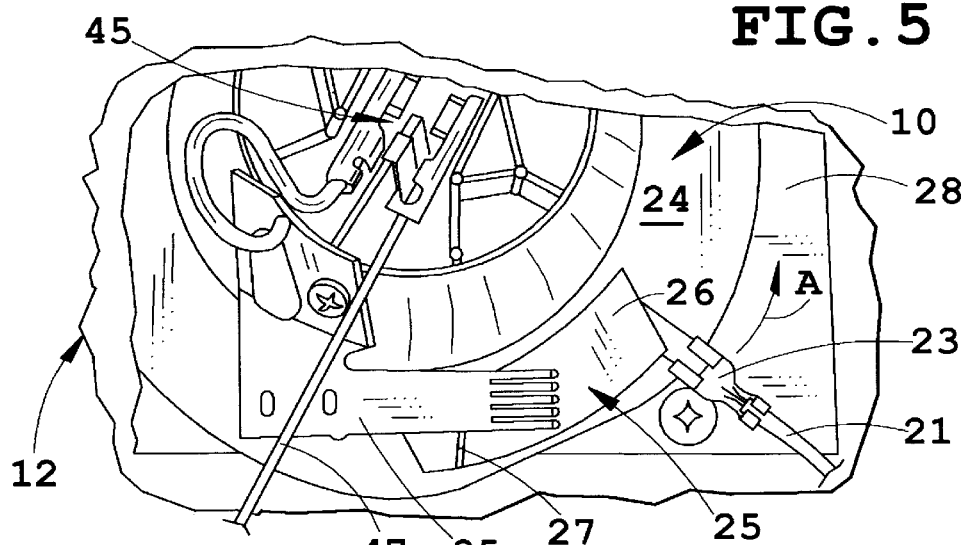
FIG. 6 is a fragmentary top plan view of the structure shown in FIG. 5, shown with the lamp rotated to a partially on position.
Figure 7:
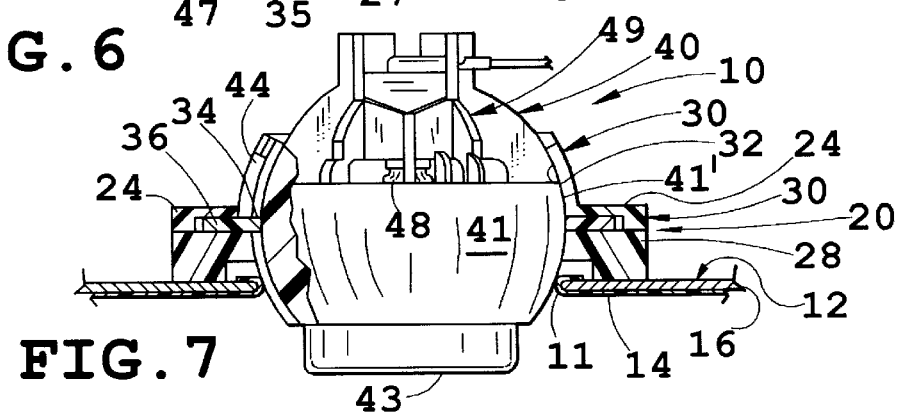
FIG. 7 is a vertical cross-sectional view of the light assembly taken through section line VII—VII of FIG. 5.

Referring initially to FIGS. 1, 2 and 7, there is shown a light assembly 10 embodying the present invention, which is mounted to the headliner 12 of a vehicle, such as an automobile. As seen in FIG. 7, the headliner 12 includes an upholstery fabric 14 which is integrally formed on a backing substrate 16 with the light assembly 10 mounted within an aperture 11 formed in the headliner and such that the upholstery fabric 14 wraps around and is supported by a housing 20 or mounting plate associated with the light assembly. Plate 20 is secured to the headliner substrate 16 by suitable fastening means which can comprise a bonding adhesive or fasteners such as self-tapping polymeric screws 22 (FIGS. 3–6). Preferably mounting plate 20 will be attached to the headliner 12 utilizing a bonding adhesive. The light assembly 10 includes the fixed mounting plate 20, a rotatable intermediate member 30 and a lamp subassembly 40, which is a generally spherical member mounted within the spherical rotatable member 30 and keyed thereto, as described below, such that when the lamp subassembly 40 is rotated in a plane generally parallel to the surface of headliner 12, the light assembly is activated to provide illumination which can be adjusted between dim and bright as the lamp subassembly 40 is further rotated.

Referring now to FIGS. 2–7, the housing 20 includes a generally rectangular plate 28 attached to the upper surface of the headliner (i.e., the surface facing the metal roof of the vehicle once installed) and includes a raised, generally annular ring 24 on which there is formed an arcuate resistor 25. Resistor 25 can be screen printed on polymeric ring 24 using a resistive ink 26 along an arcuate section of the raised ring 24 to define a variable resistor 25. Resistor 25 includes a broken section of non-conductive area 27 to define a switch as a wiper arm 35 mounted to rotatable member 30 crosses the area 27. A supply conductor 21 from the vehicle's battery is coupled to one end of resistor 25 by means of a suitable terminal 23, such that electrical current will flow through conductor 21, resistor 25 into conductive wiper arm 35 which, in turn, is coupled to a lamp socket 45 associated with lamp subassembly 40 by means of a first conductor 46 and a ground return conductor 47.

Figure 5:
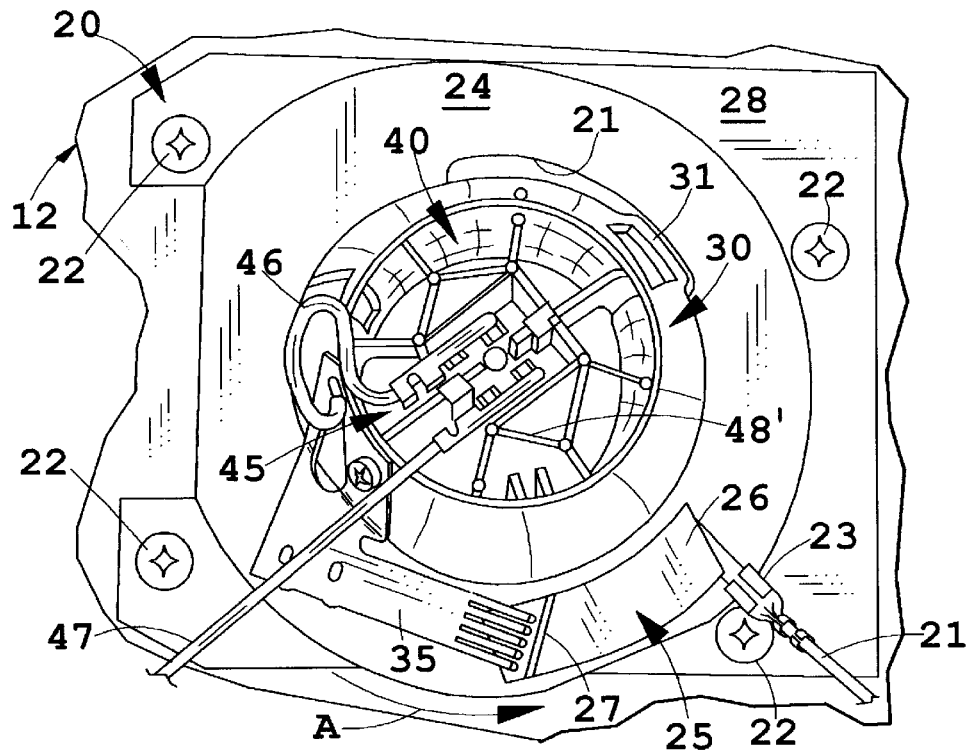
FIG. 5 is a top plan view of the light assembly shown in FIGS. 3 and 4, shown in the off position of the lamp.

The housing 20 is stationary and rotatably receives the rotatable member 30 which is, as best seen in FIGS. 3–7, a hemispherical member which receives the lamp subassembly 40 having a spherical outer wall. Ring 24 is suitably spaced above plate 28 of housing 20 to rotatably and captively receive annular flange 36 (FIG. 7) of rotatable member 30. Member 30 includes a generally spherical inner wall 32 which includes a tab 34 (FIG. 7) projecting inwardly and indexed to a slot 44 (FIGS. 2 and 7) on the outside spherical mating surface 41 of lamp subassembly 40. Thus, lamp subassembly 40 can tilt rearwardly, as shown in FIG. 3, or forwardly, as shown in FIG. 5, along slot 44 with tab 34 riding within the slot as seen in FIG. 7.

The lamp subassembly 40 includes a lens 42 for directing light outwardly therefrom. A semicylindrical knob 43 is integrally molded on the outer surface of lens 42 and can be light transmissive so as not to interrupt the light projected from the multi-faceted lens 42. Behind the lens 42, there is mounted the lamp socket 45 for receiving a light bulb 48 (FIG. 7) for directing illumination downwardly through the generally spherical housing 49 of the lamp subassembly 40. The mounting arrangement for the lamp subassembly housing 49 and rotatable member 30 can be relatively conventional with the exception of the keyed relationship between slot 44 and tab 34 to allow the lamp subassembly 40 to tilt forwardly and rearwardly without moving rotatable member 30 but, when rotated in a direction generally orthogonal to the tilting angle (i.e., in a direction indicated by arrow A in FIGS. 5 and 6 to index to the rotatable member 30 rotating member 30 causing wiper arm 35 to ride from the lamp-off position, shown in FIG. 5, along resistor 25 to increase the intensity of illumination from lamp 48 as the wiper arm moves in the direction of arrow A. The movable member 30 includes a tab 31 which rides within a slot 21 in a mounting plate 20, as seen in FIG. 5, to control the arcuate motion between an off position, as shown in FIG. 5, to the end of slot 21 which corresponds to the full on position of the light assembly 10. As can be seen in FIGS. 4–6, the construction of the lamp subassembly 40 includes the lamp socket 45 supported in spaced relationship to lens 42 by a plurality of web-like ribs 48' to support the lamp socket 45 in centered relationship within the semi-spherical lamp subassembly 40 and in spaced relationship from the upper surface of lens 42.

With the lamp assembly 10 being positioned, for example, over either the driver or passenger side of the vehicle, light from the lamp can be directed forwardly or rearwardly as desired for directing illumination therefrom and the intensity of illumination can be controlled between an off position to a full bright position utilizing knob 43 to rotate the lamp subassembly 40 and the rotatable member 30 with respect to the fixed mounting plate 20 on which resistor 25 is mounted. Thus, the lamp assembly of the present invention provides both a directable and light intensity controllable source of illumination for the interior of a vehicle and one which preferably is manufactured of individually integrally molded members 20, 30 and 40, utilizing a suitable polymeric material, such as polycarbonate. The lens 41, of course, is manufactured of light transmissive material, while the housing 49 and remaining structural elements are preferably made of light opaque pigmented polycarbonate material.

It will become apparent to those skilled in the art that various modifications to the preferred embodiment of the invention as described herein can be made without departing from the spirit or scope of the invention as defined by the appended claims.

The invention claimed is:

1. A variable intensity light assembly comprising:
   a mounting plate adapted to be mounted to a vehicle support member and having a variable resistor thereon;
   a rotatable member rotatably mounted with respect to said mounting plate, said rotatable member including a member selectively engaging said variable resistor for varying the resistance thereof; and
   a lamp subassembly including a lamp mounted within a lamp socket, said socket having one terminal coupled to said variable resistor in a series circuit with a source of operating power, said lamp subassembly being coupled to said rotatable member such that as said lamp subassembly moves the variable resistor varies the intensity of illumination from said lamp, and wherein said lamp subassembly is tiltable with respect to said rotatable member for selectively directing illumination therefrom.

2. A variable intensity light assembly comprising:
   a mounting plate adapted to be mounted to a vehicle support member and having a variable resistor thereon;
   a rotatable member rotatably mounted with respect to said mounting plate, said rotatable member including a member selectively engaging said variable resistor for varying the resistance thereof; and
   a lamp subassembly including a lamp mounted within a lamp socket, said socket having one terminal coupled to said variable resistor in a series circuit with a source of operating power, said lamp subassembly being coupled to said rotatable member such that as said lamp subassembly moves the variable resistor varies the intensity of illumination from said lamp, wherein said variable resistor is a resistance strip and said member engaging said variable resistor comprises a conductive wiper arm.

3. The light assembly as defined in claim 2 wherein said lamp subassembly is tiltable with respect to said rotatable member for selectively directing illumination therefrom.

4. The light assembly as defined in claim 3 wherein one of said rotatable member and lamp subassembly includes a slot and the other of said rotatable member and lamp subassembly includes a mating tab which slideably moves within said slot allowing said lamp subassembly to tilt with respect to said rotatable member but lockably indexing said lamp subassembly to said rotatable member when rotated in a plane generally orthogonal to the direction of tilting of said lamp subassembly for moving said wiper arm with respect to said resistance strip.

5. An overhead light assembly for a vehicle comprising:
   a fixed housing for mounting to a vehicle headliner, said housing having a resistive strip thereon;
   a rotatable member rotatably mounted with respect to said housing, said rotatable member including a conductive wiper arm selectively engaging said resistive strip of said housing; and
   a lamp subassembly including a lamp mounted within a lamp socket having one terminal coupled to said wiper arm, wherein said rotatable member and lamp subassembly are coupled to one another such that rotation of said lamp subassembly moves said wiper arm with respect to said resistive member for varying intensity of illumination from said lamp.

6. The light assembly as defined in claim 5 wherein said lamp subassembly is generally hemispherical and said rotatable member defines a spherical socket for receiving said lamp subassembly which is tiltable with respect to said rotatable member for selectively directing illumination therefrom.

7. The light assembly as defined in claim 6 wherein one of said rotatable member and said lamp subassembly includes a slot and the other of said rotatable member and said lamp subassembly includes a mating tab which slideably moves within said slot allowing said lamp subassembly to tilt with respect to said rotatable member but lockably indexing said lamp subassembly to said rotatable member when rotated in a plane generally orthogonal to the direction of tilting of said lamp subassembly for moving said wiper arm with respect to said resistance strip.

8. The light assembly as defined in claim 5 wherein said housing includes an annular ring on which said resistive strip is positioned.

9. The light assembly as defined in claim 5 wherein said housing includes an arcuate slot and said rotatable member includes a stop tab riding within said slot to define the limits of rotation of said lamp subassembly and rotatable member between lamp off and lamp full on positions.

10. The light assembly as defined in claim 9 wherein said lamp subassembly includes a knob projecting therefrom for allowing rotation of said lamp subassembly and said rotatable member.

11. A tiltable and dimming overhead light assembly comprising:
    a housing for fixed mounting to a vehicle overhead support, said housing having a variable resistor mounted thereto;
    a rotatable member rotatably mounted with respect to said housing, said rotatable member including an arm selectively engaging said variable resistor of said mounting plate for varying the resistance thereof as said rotatable member is rotated with respect to said housing; and a lamp subassembly including a lamp mounted within a lamp socket having one terminal coupled to said variable resistor, said rotatable member and lamp subassembly being coupled to one another such that rotation of said lamp subassembly rotates said rotatable member to vary the resistance of said variable resistor for varying intensity of illumination from said lamp, wherein one of said rotatable member and lamp subassembly includes a slot and the other of said rotatable member and lamp subassembly includes a mating tab which slideably moves within said slot allowing said lamp subassembly to tilt with respect to said rotatable member but lockably indexing said lamp subassembly when rotated in a plane generally orthogonal to the direction of tilting of said lamp subassembly.

12. The light assembly as defined in claim 11 wherein said variable resistor is a resistance strip and said arm engaging said variable resistor comprises a conductive wiper arm.

13. The light assembly as defined in claim 12 wherein said housing includes an arcuate slot and said rotatable member includes a stop tab riding within said slot to define the limits of rotation of said lamp subassembly and rotatable member between lamp off and lamp full on positions.

14. The light assembly as defined in claim 13 wherein said lamp subassembly includes a knob projecting therefrom for allowing rotation of said lamp subassembly and said rotatable member.

15. The light assembly as defined in claim 14 wherein said lamp subassembly is generally hemispherical and said rotatable member defines a spherical socket for receiving said lamp subassembly which is tiltable with respect to said rotatable member for selectively directing illumination therefrom.

\* \* \* \* \*